US008093870B2

(12) United States Patent
Mueller

(10) Patent No.: US 8,093,870 B2
(45) Date of Patent: Jan. 10, 2012

(54) GENERATOR APPARATUS WITH ACTIVE LOAD DUMP PROTECTION

(75) Inventor: Markus Mueller, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 466 days.

(21) Appl. No.: 12/303,450

(22) PCT Filed: May 25, 2007

(86) PCT No.: PCT/EP2007/055088
§ 371 (c)(1),
(2), (4) Date: Apr. 7, 2009

(87) PCT Pub. No.: WO2008/006643
PCT Pub. Date: Jan. 17, 2008

(65) Prior Publication Data
US 2010/0026249 A1    Feb. 4, 2010

(30) Foreign Application Priority Data
Jul. 14, 2006   (DE) .................... 10 2006 032 736

(51) Int. Cl.
*H02P 11/00*    (2006.01)
*H02P 9/00*     (2006.01)
*H02H 7/06*     (2006.01)
(52) U.S. Cl. ............... 322/24; 322/28; 361/3; 701/103; 702/74
(58) Field of Classification Search .............. 322/24, 322/28; 361/3; 701/103; 702/74
See application file for complete search history.

(56) References Cited

U.S. PATENT DOCUMENTS

| | | | | |
|---|---|---|---|---|
| 4,131,927 A | * | 12/1978 | Tsuchiya et al. | 361/6 |
| 4,245,184 A | * | 1/1981  | Billings et al. | 323/235 |
| 4,379,990 A | * | 4/1983  | Sievers et al.  | 322/99 |
| 4,542,462 A | * | 9/1985  | Morishita et al.| 701/1 |
| 4,584,515 A | * | 4/1986  | Edwards         | 322/28 |
| 4,661,910 A |   | 4/1987  | Reinecke et al. | 701/76 |
| 4,965,755 A | * | 10/1990 | Patton et al.   | 702/74 |
| 5,032,972 A | * | 7/1991  | Erckert         | 363/97 |
| 5,216,567 A | * | 6/1993  | Kontanzer       | 361/3 |
| 5,719,486 A | * | 2/1998  | Taniguchi et al.| 322/28 |
| 6,163,138 A | * | 12/2000 | Kohl et al.     | 322/28 |
| 6,392,422 B1| * | 5/2002  | Kammer et al.   | 324/650 |
| 7,233,082 B2| * | 6/2007  | Furuya et al.   | 307/64 |
| 7,650,222 B2| * | 1/2010  | Shiraishi et al.| 701/103 |
| 7,747,378 B2| * | 6/2010  | Shiraishi et al.| 701/103 |

(Continued)

FOREIGN PATENT DOCUMENTS

DE        43 00 882         7/1994

(Continued)

OTHER PUBLICATIONS

International Search Report, PCT/EP2007/055088, dated Nov. 20, 2007.

*Primary Examiner* — Pedro J Cuevas
(74) *Attorney, Agent, or Firm* — Kenyon & Kenyon LLP

(57) ABSTRACT

A generator apparatus includes a generator, a generator controller, and a rectifier bridge. A detector unit for recognizing a load shutoff is also provided. When a load shutoff is recognized, a switch is controlled to be transmissive so that energy produced by the load shutoff is stored in an energy reservoir. From there it can be fed back into the vehicle electrical system.

9 Claims, 1 Drawing Sheet

U.S. PATENT DOCUMENTS

| | | | | |
|---|---|---|---|---|
| 7,872,377 B2 * | 1/2011 | Wilson | ............ | 307/114 |
| 2003/0030072 A1 | 2/2003 | Heinisch et al. | ............ | 257/200 |
| 2004/0264089 A1 * | 12/2004 | Furuya et al. | ............ | 361/92 |
| 2009/0071439 A1 * | 3/2009 | Shiraishi et al. | ............ | 123/403 |
| 2009/0076708 A1 * | 3/2009 | Shiraishi et al. | ............ | 701/103 |
| 2009/0112442 A1 * | 4/2009 | Tsunooka | ............ | 701/103 |
| 2010/0176661 A1 * | 7/2010 | Wilson | ............ | 307/114 |

FOREIGN PATENT DOCUMENTS

| | | |
|---|---|---|
| DE | 197 42 391 | 11/1998 |
| DE | 101 35 168 | 2/2003 |
| EP | 0 179 194 | 4/1986 |
| EP | 1 278 283 | 1/2003 |

* cited by examiner

GENERATOR APPARATUS WITH ACTIVE LOAD DUMP PROTECTION

FIELD OF THE INVENTION

The present invention relates to a generator apparatus having a generator that encompasses an exciter winding and phase windings; having a generator controller that furnishes a control voltage to the generator; and having a rectifier bridge for rectification of the phase voltages made available by the generator, for the purpose of making available a DC supply voltage for a switchable load on a DC supply voltage lead.

BACKGROUND INFORMATION

A generator apparatus that has a generator, a generator controller, and a rectifier bridge is already known. It is used, for example, in a motor vehicle in order to rectify the motor-vehicle generator voltage. The rectifier bridge of the known generator apparatus has at least six Zener diodes, which can be pressed into a heat sink. The purpose of Zener diodes, which become conductive in the reverse direction above a certain voltage, is to protect the generator controller and the vehicle electrical system from overvoltages that are caused by load shutoffs. Zener diodes of different current classes, for example 35A, 50A, 65A, and 80A, are used depending on the rated generator current present in each case. For technical reasons, especially in order to account for a load-dump situation, the aforesaid current classes are further subdivided into so-called Zener voltage classes, for example in 1.5-volt steps between 19 V and 25 V.

The Zener diodes are operated in the reverse direction when large generator currents are abruptly shut off. This is the case, for example, with a so-called load dump, which corresponds to a deenergization of the B+ cable, i.e. of the DC supply voltage lead of the vehicle electrical system. In a load dump situation, the generator controller cannot compensate sufficiently quickly for the shutoff of the generator current. The generator current must continue to flow for physical reasons, since a current cannot jump through an inductance.

Because the loads of the vehicle electrical system, as well as the vehicle battery, are no longer connected to the generator in the case of a load dump, the energy stored in the exciter winding and in the rotor causes a rise in the phase voltages in the phase windings or stator windings. This voltage rise in the phase windings in turn results in a breakdown of the Zener diodes in the reverse direction.

DE 101 35 168 discloses an apparatus for protecting electronic components from overvoltages in the operating voltage, which apparatus has at least one semiconductor transistor that can be made conductive by way of a control circuit at predetermined overvoltage values, with the result that a conversion of electrical energy into thermal energy occurs.

SUMMARY

According to example embodiments of the present invention, a generator apparatus having the features described herein has the advantage that load dump energy is buffered and can then be used to power a load. A further advantage is the fact that a Zener diode of a lower current class can be used in the rectifier bridge. This yields cost advantages. A further result that can be achieved, if applicable, is that fewer Zener diodes can suffice for the rectifier bridge. For example, rectifier bridges are known in which two parallel-connected Zener diodes are connected in series in each of the diode strands. In this case, if applicable, the second respective parallel-connected diode in each diode strand can be dispensed with.

The detector unit preferably has a measured data acquisition module, an evaluation module, and a switch control module. The measured data acquisition module serves to sense the generator current and/or the DC supply voltage. The evaluation module advantageously detects load shutoffs by evaluating the gradient of the generator current and/or the gradient of the DC supply voltage. This evaluation of the gradient allows load shutoffs to be reliably detected. The information detected by the evaluation module regarding a load shutoff is converted by the switch control module into switch control signals, so that the load dump energy resulting from the load shutoff can be transferred to an energy reservoir. From there, it can be delivered in meaningful fashion to the loads connected to the generator. Alternatively thereto, the energy stored in the energy reservoir can also be discharged to ground.

Further advantageous properties of example embodiments of the present invention are described below, by way of examples, with reference to the Figures.

DETAILED DESCRIPTION

Figure 1:
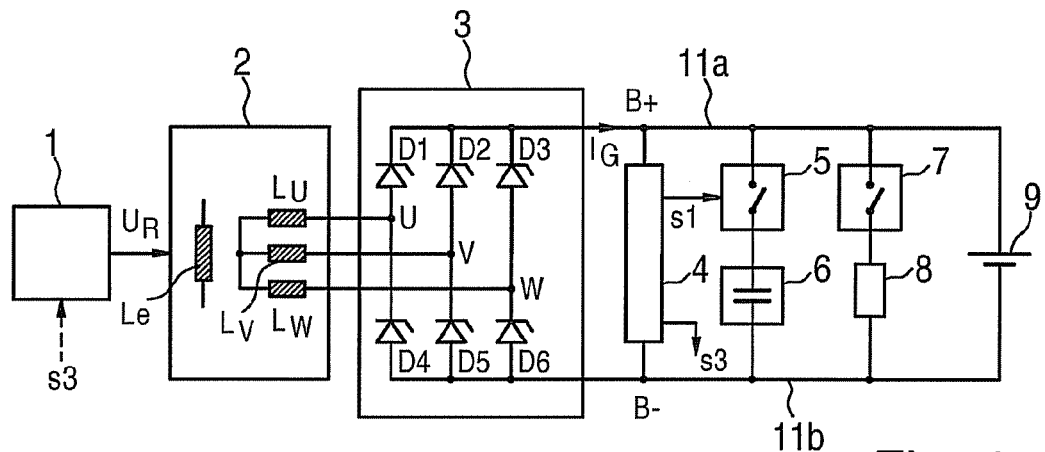
FIG. 1 is a block diagram to explain an exemplifying embodiment of the present invention.

FIG. 1 is a block diagram to explain an exemplifying embodiment of the present invention. The generator apparatus depicted therein is a motor-vehicle generator apparatus that is provided for making available DC supply voltages B+ and B− for the vehicle electrical system of a motor vehicle on DC supply voltage leads 11a and 11b.

The generator apparatus that is shown has a generator controller 1, a generator 2, and a rectifier bridge 3 that can be pressed into a heat sink. Generator controller 1 makes available to generator 2 a control voltage $U_R$. Generator 2 contains a rotor having an excitation coil $L_e$ that has an excitation current applied to it during operation, and a stator that has phase windings $L_U$, $L_V$, and $L_W$. On the output side, generator 2 makes available phase voltages U, V, and W that serve as input variables for the downstream rectifier bridge 3. Rectifier bridge 3 has six Zener diodes D1, D2, D3, D4, D5, and D6; diodes D1 and D4, D2 and D5, and D3 and D6 respectively constitute a diode strand. Rectifier bridge 3 serves to convert the phase voltages U, V, W delivered to it into DC voltages B+ and B−. The latter are delivered to the motor vehicle's electrical system via DC supply voltage leads 11a and 11b.

The DC supply voltages B+ and B− made available to the vehicle electrical system are applied to a detector unit 4. The latter is provided in order to recognize a load shutoff such as that which occurs, for example, upon an interruption or a failure of DC supply voltage lead 11a. When the detector unit has recognized the occurrence of a load shutoff, it then generates a control signal s1 that closes a switch 5, i.e. brings it into the conductive state. One terminal of this switch 5, which is a switching transistor, is connected to DC supply voltage lead 11a. The other terminal of switch 5 is connected to one terminal of an energy reservoir 6 whose other terminal is connected to the further DC supply voltage lead 11b or to reference potential. Once switch 5 is closed, energy reservoir 6 is then connected via switch 5 to DC supply voltage lead 11a, so that when an overvoltage caused by the load dump instance exists, charging of energy reservoir 6 occurs. Once the load dump has ended, which is the case after about 400 ms, detector unit 4 then generates a control signal s1 that brings switch 5 back into the blocked state.

The energy stored in energy reservoir 6 can then be fed back into the vehicle electrical system. For this purpose, detector unit 4 delivers to generator controller 1 a control signal s3 that informs generator controller 1 of the occurrence of a load dump instance. After a predetermined and defined time interval has elapsed after occurrence of the load dump instance, or after an energy request from a vehicle electrical system load, generator controller 1 makes available to generator 2 a control voltage $U_R$ on the basis of which the excitation current flowing through excitation winding $L_e$ is reduced. This causes the generator current $I_G$ flowing in DC supply voltage lead 11a also to be reduced to zero. Once this has happened, detector unit 4 brings switch 5 back into its conductive state via control signal s1. With switch 5 in this conductive state, the load-dump energy stored in energy reservoir 6 is fed via DC supply voltage lead 11a back into the vehicle electrical system and delivered therein, for example, through the closed switch 7 to load 8. This load 8 is, for example, the seat heater or rear-window heater of the motor vehicle.

Once energy reservoir 6 is discharged, switch 5 is brought back into its blocked state by detector unit 4.

As an alternative to feeding the load dump energy stored in energy reservoir 6 back into the vehicle electrical system, said load dump energy can also be discharged to ground through a short circuit that is created.

Figure 2:
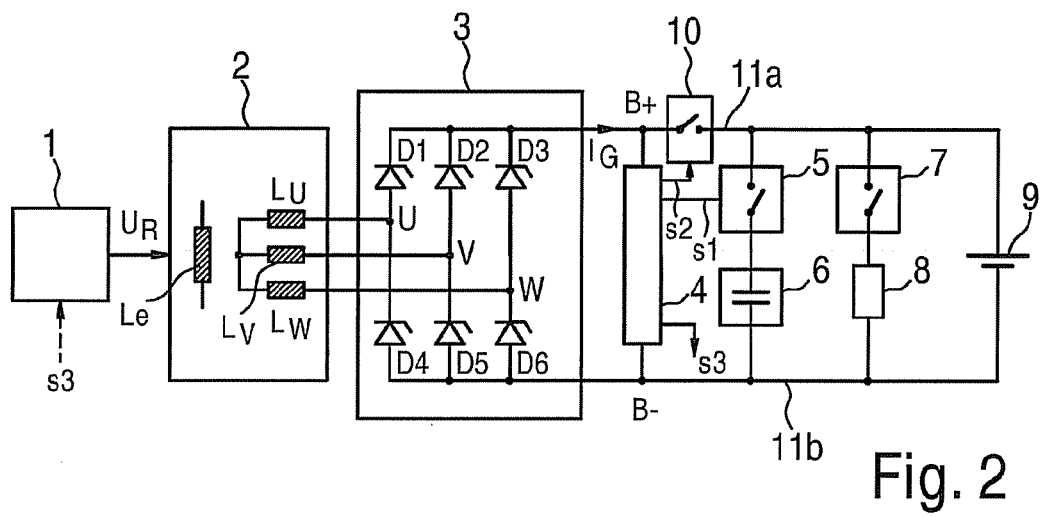
FIG. 2 is a block diagram to explain an exemplifying embodiment of the present invention.

FIG. 2 is a block diagram to explain an exemplifying embodiment of the present invention. The generator apparatus depicted therein is once again a motor-vehicle generator apparatus that is provided for making available DC supply voltages B+ and B− for the vehicle electrical system of a motor vehicle on DC supply voltage leads 11a and 11b.

The generator apparatus that is shown has a generator controller 1, a generator 2, and a rectifier bridge 3 that can be pressed into a heat sink. Generator controller 1 makes available to generator 2 a control voltage $U_R$. Generator 2 contains a rotor having an excitation coil $L_e$ that has an excitation current applied to it during operation, and a stator that has phase windings $L_U$, $L_V$, and $L_W$. On the output side, generator 2 makes available phase voltages U, V, and W that serve as input variables for the downstream rectifier bridge 3. Rectifier bridge 3 has six Zener diodes D1, D2, D3, D4, D5, and D6; diodes D1 and D4, D2 and D5, and D3 and D6 respectively constitute a diode strand. Rectifier bridge 3 serves to convert the phase voltages U, V, W delivered to it into DC voltages B+ and B−. The latter are delivered to the motor vehicle's electrical system via DC supply voltage leads 11a and 11b.

The DC supply voltages B+ and B− made available to the vehicle electrical system are applied to a detector unit 4. The latter is provided in order to recognize a load shutoff such as that which occurs, for example upon an interruption or failure of DC supply voltage lead 11a. When the detector unit has recognized the occurrence of a load shutoff, it then generates a control signal s1 that closes a switch 5, i.e. brings it into the conductive state. One terminal of this switch 5, which is a switching transistor, is connected to DC supply voltage lead 11a. The other terminal of switch 5 is connected to one terminal of an energy reservoir 6 whose other terminal is connected to the further DC supply voltage lead 11b or to reference potential. Once switch 5 is closed, energy reservoir 6 is then connected via switch 5 to DC supply voltage lead 11a, so that when an overvoltage caused by the load dump instance exists, charging of energy reservoir 6 occurs. Once the load dump has ended, which is the case after about 400 ms, detector unit 4 then generates a control signal s1 that brings switch 5 back into the blocked state.

The energy stored in energy reservoir 6 can then be fed back into the vehicle electrical system. For this purpose, detector unit 4 firstly delivers a control signal s2 to a switch 10 disposed in DC supply voltage lead 11a. This signal controls switch 10 such that generator current $I_G$ flowing toward the vehicle electrical system is gradually reduced to zero. Once this has happened, detector unit 4 then brings switch 5 back into its conductive state via control signal s1. With switch 5 in this conductive state, the load-dump energy stored in energy reservoir 6 is fed via DC supply voltage lead 11a back into the vehicle electrical system and delivered therein, for example, through the closed switch 7 to load 8. This load 8 is, for example, the seat heater or rear-window heater of the motor vehicle.

Switch 10 is, for example, a switch whose resistance changes in linear fashion. If a mechanical switch that has only the "ON" or "OFF" switch positions is used, it is necessary to ensure that it receives a switching command only once generator current $I_G=0$ A, for example for loads that are operated after shutdown, as is the case for fans. Otherwise the consequence would be a load rejection and a loading of the Zener diodes in the reverse direction.

As an alternative thereto, the possibility exists of decreasing the control voltage, via control signal s3, to a value that is lower than the battery voltage. In this case the generator no longer delivers current.

Once energy reservoir 6 is discharged, switch 5 is then brought back into its blocked state, and switch 10 into its conductive state, by detector unit 4.

Figure 3:
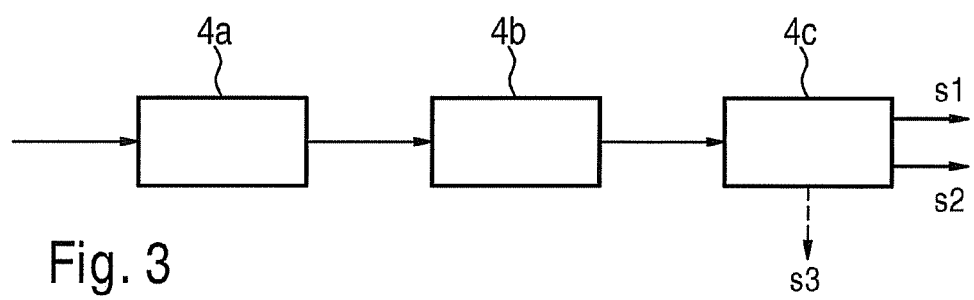
FIG. 3 is a block diagram to explain an exemplifying embodiment of the construction of the detector unit depicted in FIGS. 1 and 2.

FIG. 3 is a block diagram to explain an exemplifying embodiment of the construction of detector unit 4 depicted in FIGS. 1 and 2. The unit has a measured data acquisition module 4a, an evaluation module 4b connected to the measured data acquisition module, and a switch control module 4c connected to the evaluation module. Measured data acquisition module 4a is provided in order to sense generator current $I_G$ and/or the DC supply voltage B+ made available on DC supply voltage lead 11a. Evaluation module 4b detects load shutoffs by evaluating the gradient $dI_G/dt$ of generator current $I_G$ and/or the gradient $dB+/dt$ of DC supply voltage B+. If the ascertained gradient(s) exceed(s) predefined threshold values, switch control module 4c then generates the above-described control signals s1 for switch 5 and s3 for generator controller 1, or s1 for switch 5, s2 for switch 10, and if applicable s3 for generator controller 1.

The table below shows examples of the current drop and voltage rise in the event of a load dump:

| Load dump instance | $dI_G/dt$ | $dB+/dt$ |
|---|---|---|
| 6000 rpm, full load to 20% $I_G$nom | −0.4 A/µs | +40.0 mV/µs |
| 6000 rpm, full load to 0 A | −0.8 A/µs | +40.0 mV/µs |
| 18,000 rpm, full load to 0 A | −0.8 A/µs | +40.0 mV/µs |

The current gradient depends only on the difference in current before and after the load shutoff, independently of generator rotation speed. In the least favorable case, a shutoff from full load to 0 A takes place. The voltage gradient is independent of these influencing variables.

The use of a detector unit 4 as described above offers, in addition to load dump protection and energy storage, the possibility that Zener diodes of a lower current class, for example a 50 A chip instead of a 65 A chip, can be used in rectifier bridge 3. This results in a cost advantage, depending on chip size, in the range from approximately 3 to 5 cents per diode. If applicable, the rectifier bridge can be equipped with single diodes instead of a double configuration, i.e. a parallel circuit of two diodes in each case. This results in a cost advantage of approximately 75 to 90 cents per rectifier, depending on chip size.

What is claimed is:

1. A generator apparatus, comprising:
    a generator including an exciter winding and phase windings;
    a generator controller adapted to furnish a control voltage to the generator;
    a rectifier bridge adapted to rectify phase voltages made available by the generator to make available a DC supply voltage for a switchable load on a DC supply voltage lead;
    a detector unit adapted to recognize a load shutoff;
    an energy reservoir; and
    a first switch controllable by the detector unit and arranged between the DC supply voltage lead and the energy reservoir;
    wherein the detector unit is adapted to switch the first switch to transmissivity after a load shutoff is recognized, so that energy produced by the load shutoff is stored in the energy reservoir.

2. The generator apparatus according to claim 1, wherein the detector unit includes a measured data acquisition module, an evaluation module, and a switch control module.

3. The generator apparatus according to claim 2, wherein the measured data acquisition module is adapted to sense at least one of (a) a generator current and (b) the DC supply voltage.

4. The generator apparatus according to claim 2, wherein the evaluation module is adapted to detect load shutoffs by evaluating a gradient of at least one of (a) a generator current and (b) the DC supply voltage.

5. The generator apparatus according to claim 2, wherein the switch control module is adapted to control the first switch.

6. The generator apparatus according to claim 1, wherein energy stored in the energy reservoir is deliverable to the load via at least one switch.

7. The generator apparatus according to claim 1, wherein the detector unit is adapted to signal to the generator controller a detected load shutoff, and once a predetermined time interval after the detection of a load shutoff has elapsed, the generator controller furnishes to the generator a control voltage such that a generator current is reduced.

8. The generator apparatus according to claim 1, further comprising a second switch, arranged in the DC supply voltage lead, adapted to reduce a generator current flowing from the generator to the load.

9. The generator apparatus according to claim 7, wherein energy stored in the energy reservoir is deliverable to the load after reduction of the generator current has been accomplished.

* * * * *